US006956825B2

(12) United States Patent
Lee et al.

(10) Patent No.: US 6,956,825 B2
(45) Date of Patent: Oct. 18, 2005

(54) SYSTEM FOR MANAGING COMMUNITY ETHERNET SWITCH AND APPARATUS THEREOF

(75) Inventors: Chung-Wang Lee, Hsinchu (TW); Chin-Kun Chang, Hsinchu (TW)

(73) Assignee: D-Link Corp., Hsinchu (TW)

( * ) Notice: Subject to any disclaimer, the term of this patent is extended or adjusted under 35 U.S.C. 154(b) by 898 days.

(21) Appl. No.: 09/888,421

(22) Filed: Jun. 26, 2001

(65) Prior Publication Data

US 2002/0196740 A1 Dec. 26, 2002

(51) Int. Cl.[7] .......................... H04L 12/26; H04L 12/28
(52) U.S. Cl. ....................................... 370/250; 370/401
(58) Field of Search ................................ 370/249, 250, 370/401, 251, 360, 241.1, 252; 709/224, 223

(56) References Cited

U.S. PATENT DOCUMENTS 5,790,548 A * 8/1998 Sistanizadeh et al. ....... 370/401
6,088,368 A * 7/2000 Rubinstain et al. ......... 370/480
6,101,182 A * 8/2000 Sistanizadeh et al. ....... 370/352
6,208,616 B1 * 3/2001 Mahalingam et al. ....... 370/216
6,360,260 B1 * 3/2002 Compliment et al. ....... 709/224
6,477,567 B1 * 11/2002 Ohara ........................ 709/223
2002/0034162 A1 * 3/2002 Brinkerhoff et al. ........ 370/229
2003/0115314 A1 * 6/2003 Kawashima ................ 709/224
2003/0185152 A1 * 10/2003 Nederveen et al. ......... 370/229

* cited by examiner

*Primary Examiner*—Hassan Kizou
*Assistant Examiner*—Hong Sol Cho
(74) *Attorney, Agent, or Firm*—Bacon & Thomas, PLLC

(57) ABSTRACT

A system for managing a community Ethernet switch and apparatus utilizes a network management control circuit for receiving network management packets from the exchange through an independent line and based on the received network management packets for setting a management value of a management information base (MIB) of a simple network management protocol (SNMP) by the SNMP so that the Ethernet switch is capable of monitoring the at least one network interface circuit based on the management value, and transmitting enable or disable signals to a detection loop installed therein based on the management value when the network interface circuit is disabled for performing a loop detection on each network interface circuit, writing a test result into the MIB, and commanding the SNMP to collect the result for transmitting to the exchange for analysis and determination by network management personnel.

6 Claims, 3 Drawing Sheets

SYSTEM FOR MANAGING COMMUNITY ETHERNET SWITCH AND APPARATUS THEREOF

FIELD OF THE INVENTION

The present invention relates to the Internet and more particularly to a system for managing community Ethernet switch and apparatus thereof.

BACKGROUND OF THE INVENTION

In recent years, Internet has been widely employed worldwide. In particular, the World Wide Web (WWW) portion of Internet can provide voice, graphics, and multimedia services in addition to e-mail transmission and receiving. Hence, people can access a variety of information from WWW. Further, many people take log-on the Internet as a daily work. For accommodating such trend, a variety of high speed network devices have been provided by network equipment manufacturers. Such devices comprises cable modem, asymmetric digital subscriber line (ADSL), etc. Moreover, various associated network peripherals are provided by network equipment manufacturers for enhancing the functionality of network. Such peripherals comprises voice over IP device (VoIP), etc. User can employ VoIP to communicate with a remote user over the Internet so as to greatly reduce long distance or international telecommunication charge.

Current network structures may be broken down into the following three broad categories based on a connection between end user and the Internet:

(1) ADSL based network structure. A connection of the ADSL based network is shown in FIG. 1. An Ethernet NIC 10 at end user comprises an ADSL communication interface 11 and a router control circuit 12 coupled to an exchange 14 through a telephone line 13 for transmitting ADSL (or ATM) packet signals thereto or receiving the same therefrom. Exchange 14 also transmits generated ATM packet signals to the Internet 15 (or receives ATM packet signals from the Internet 15) through a fiber-optic line 131 connected therebetween by utilizing ATM network structure thereof. The transmission rate is about 640K byte per second while uploading or about 1.5M byte per second while downloading with the provision of fiber-optic line 131 as packet transmission medium. However, its cost is inhibitory high for ordinary network users since it is required to install the high speed ATM network in the exchange. Hence, the ADSL based network structure is rarely implemented.

(2) Cable modem based network structure. A connection of the cable modem based network is shown in FIG. 2. As shown, a plurality of Ethernet network interface cards (NICs) 20 each is coupled to one of a plurality of cable modems 201 which is further coupled to a node 22 in a community installed by a cable TV company (or network services provider or exchange) through cable 21. Node 22 is in turn coupled to a network equipment 24 provided by cable TV company through a fiber-optic line 23. Network equipment 24 is also coupled to the Internet 25 through fiber-optic line 23. Hence, packets signals may be sent from Ethernet NICs 20 to the Internet 25, or alternatively Ethernet NICs 20 may receive packet signals from the Internet 25. In this network structure, node 22 in a community installed by a cable TV company may utilize the high speed fiber-optic line 23 to send signals to about 100 to 500 end users in a typical community through cable 21 of cable TV company. This can increase transmission rate of signals between end users and the Internet. Hence, such cable modem based network structures only have been employed in communities having cable TV services. Typically, a cable TV company may utilize a single fiber-optic line for transmitting packets including management and data packets in managing nodes installed by a cable TV company in communities. Hence, such network is subject to intrusion by hacker. This is a management drawback.

(3) Unshielded twisted pair (UTP) based network structure. A connection of the UTP based network is shown in FIG. 3. A plurality of Ethernet NICs 30 at end users each also comprises an ADSL communication interface 11 (not shown) and a router control circuit 12 (not shown) coupled to an Ethernet switch 32 installed in a community by an exchange (or network services provider) through an existing UTP telephone line 31. Ethernet switch 32 is in turn coupled to an Ethernet equipment 34 provided by exchange through a fiber-optic line 33. Ethernet equipment 34 is also coupled to the Internet 35 through fiber-optic line 33. Hence, packets signals may be sent from Ethernet NICs 30 to the Internet 35, or alternatively Ethernet NICs 30 may receive packets signals from the Internet 35. In this network structure, Ethernet switch 32 in a community installed by the exchange may utilize the high speed fiber-optic line 33 to send signals to a predetermined number of end users in a typical community through existing UTP telephone line 31. This can increase transmission rate of signals between end users and the Internet. Hence, such UTP based network structures have been widely employed in local networks of communities. Typically, management of the network is performed in an online manner since there is a considerable distance between Ethernet switch 32 in a community and the exchange, thus inhibiting an on-the-site network maintenance and management. Further, such online technique is restricted by a simple network management protocol (SNMP), thus inhibiting a real time online maintenance and management on Ethernet switch by the exchange. Instead, maintenance personnel has to go to the site of Ethernet switch for maintenance. This has the drawbacks of increasing management cost, lowering network service quality, and many more. Thus improvement exists.

SUMMARY OF THE INVENTION

It is therefore an object of the present invention to provide a system for managing a community Ethernet switch and apparatus thereof. The Ethernet switch comprises a network management control circuit for receiving network management packets from the exchange through an independent line and based on the received network management packets for setting a management value of a management information base (MIB) of a simple network management protocol (SNMP) by the SNMP so that the Ethernet switch is capable of monitoring the at least one network interface circuit based on the management value. A detection loop is provided on each network interface circuit so that based on the management value of the MIB the Ethernet switch can transmit enable or disable signals to each detection loop for activation when the network interface circuit is disabled. The system further performs a loop detection on each network interface circuit, writes a test result into the MIB, and commands the SNMP to collect the result for transmitting to the exchange for analysis and determination by network management personnel. By utilizing this, exchange can carry out an online real time monitor and management on a remote Ethernet switch.

The above and other objects, features and advantages of the present invention will become apparent from the following detailed description taken with the accompanying drawings.

DETAILED DESCRIPTION OF THE PREFERRED EMBODIMENTS

The invention is directed to a system for managing community Ethernet switch and apparatus thereof for solving above problem (i.e., real time online maintenance and management on Ethernet switch by the exchange is impossible) associated with conventional UTP based network structure. With the invention, above conventional UTP based network structure is capable of effecting a real time online maintenance and management on Ethernet switch by the exchange. Currently, network management application installed on network is a simple network management protocol (SNMP). The SNMP is implemented on seventh layer (i.e., transmission layer) of Open System Interconnection (OSI) model. SNMP can access management information (e.g., device characteristics, packet throughput, errors, etc.) from network devices. Such accessed information is stored in a management information base (MIB). Then network manager may access such information from MIB by utilizing SNMP in order to carry out an online management. When a user datagram protocol (UDP) of lower layer (i.e., transmission layer) is employed by SNMP to connect network devices, a connection message is written into a packet to be transmitted. Then the packet is transmitted by a lower Internet protocol (IP). Such UDP may effect a faster network information transmission among network devices. But such transmission is a nonlinear service. That is, neither a connection is established between two parties in advance nor it will detect a potential error during the transmission. Hence, such transmission service provided by UDP is not reliable. Also, SNMP on the upper layer is a passive network management system. That is, under SNMP a counterpart will not provide message actively if there is no inquiry issued by network manager. In the case of mass packet transmission if there is a packet lost during transmission under UDP, SNMP will not acknowledge this. Hence, there is no real time management service available on network in related software.

Figure 1:
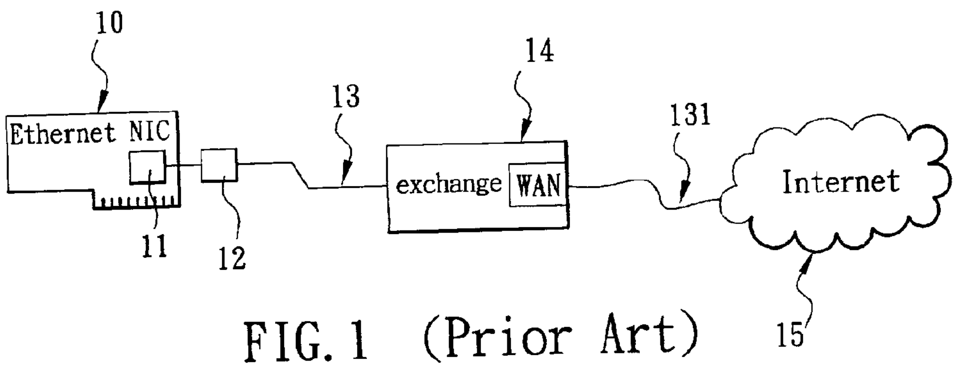
FIG. 1 schematically shows the connection of a conventional ADSL based network structure.
Figure 2:
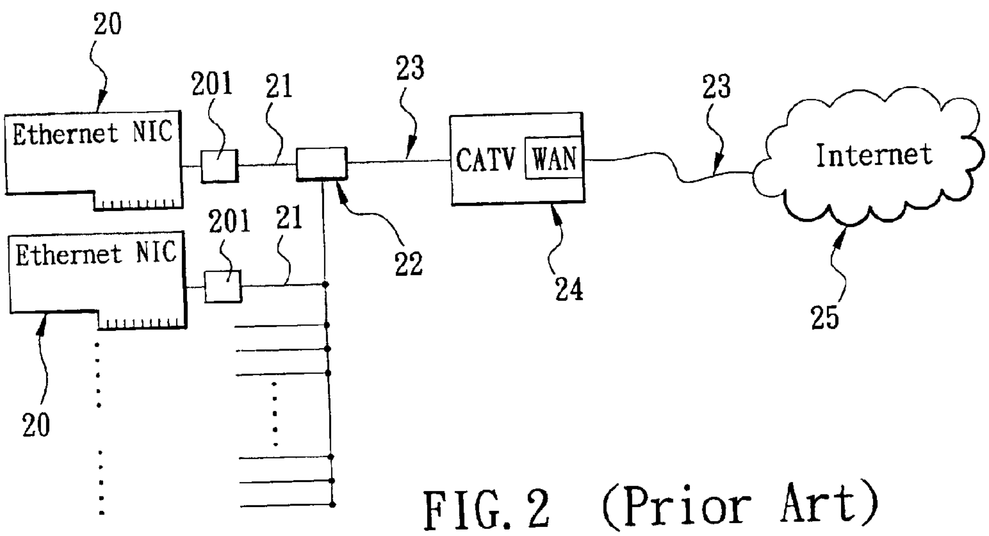
FIG. 2 schematically shows the connection of a conventional cable modem based network structure.
Figure 3:
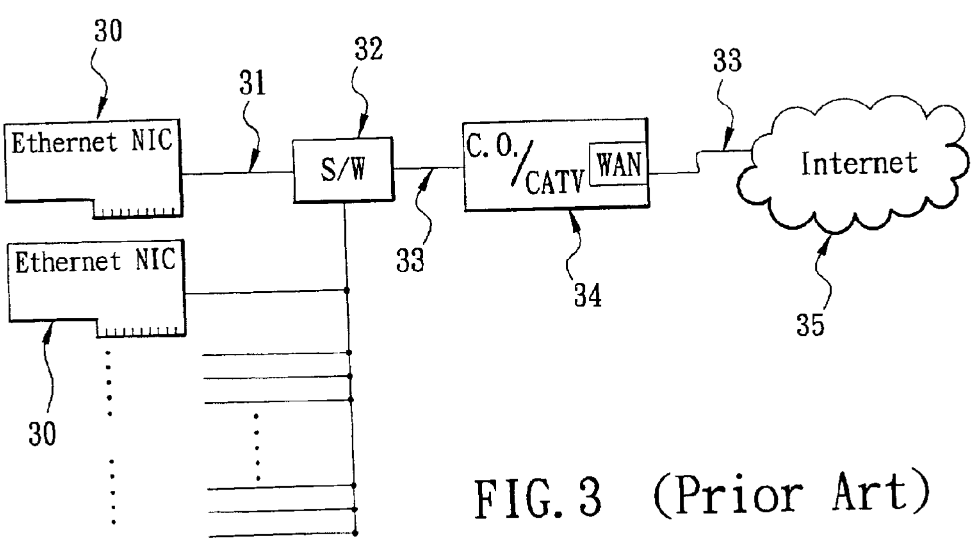
FIG. 3 schematically shows the connection of a conventional UTP based network structure.
Figure 4:
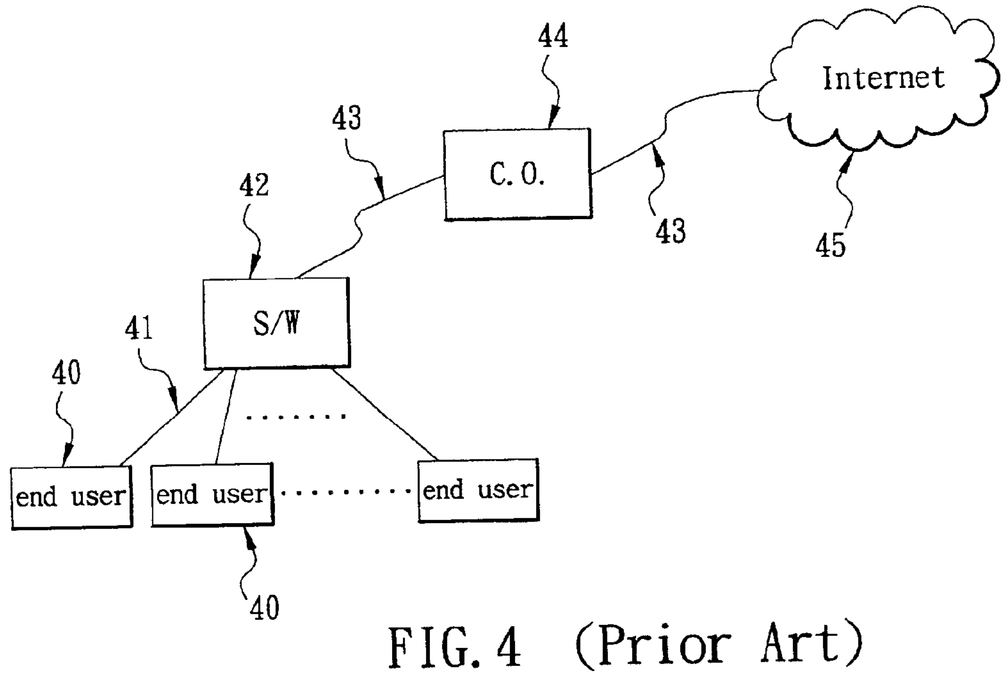
FIG. 4 schematically shows the connection of another conventional UTP based network structure.

FIG. 4 schematically shows the connection of the conventional UTP based network structure. A plurality of end users each couples to an Ethernet switch 42 in a community through an existing telephone line 41. Exchange 44 further interconnects Ethernet switch 42 and the Internet 45 through fiber-optic line 43. Hence, packet messages may be sent from end users 40 to the Internet 45 or vice versa. Also, I/O ports on Ethernet switch 42 coupled to respective end user 40 do not incorporate a telephone loop detection mechanism as provided on well known I/O ports of exchange. Hence, it is not adapted to network with respect to hardware configuration. Accordingly, it is impossible of effecting a real time monitor and management on respective network interface circuit of Ethernet switch 42. In addition, in the conventional network structure each end user 40 can transmit packet message to exchange 44 through Ethernet switch 42 and fiber-optic line 43. Hence, as exchange 44 performs a monitor and management on Ethernet switch 42 through the same fiber-optic line 43, the network is subject to intrusion by hacker. This is a management drawback.

Figure 5:
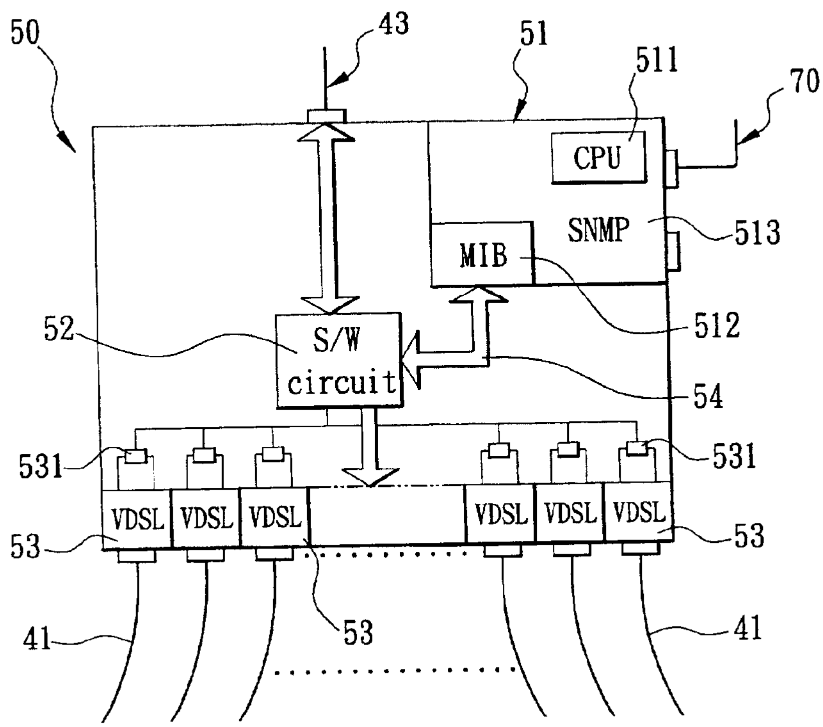
FIG. 5 is a schematic drawing showing constituent components of an Ethernet switch and electrical connection thereof according to the invention.

FIG. 5 is a schematic drawing showing constituent components of an Ethernet switch 50 and electrical connection thereof according to the invention. Ethernet switch 50 comprises an Ethernet switching circuit 52, a network management control circuit 51, and a plurality of network interface circuits 53. Ethernet switching circuit 52 is implemented as a well known control circuit of Ethernet switch for receiving packets sent from exchange. And in turn such packets are sent to Ethernet NIC of respective end user through a corresponding network interface circuit 53. Alternatively, packets sent from Ethernet NIC of respective end user are transmitted to the exchange through corresponding network interface circuit 53. Network management control circuit 51 acts to receive network management packets from exchange. A central processing unit (CPU) 511 in network management control circuit 51, based on received network management packets through SNMP 513 installed in network management control circuit 51, sets an MIB 512 of SNMP so as to enable or disable management values of network interface circuits 53 accordingly. Network management control circuit 51 transmits management values of network interface circuits 53 to Ethernet switching circuit 52 through a bus 54. With these management values, Ethernet switching circuit 52 can monitor network interface circuits 53. A detection loop 531 is provided on each network interface circuit 53. Hence, based on management values of network interface circuits 53 network management control circuit 51 can transmit enable or disable signals to each detection loop 531 for activation when network interface circuits 53 are disabled. As such, a loop detection may be performed on network interface circuits 53. The result is then written into MIB 512.

Figure 6:
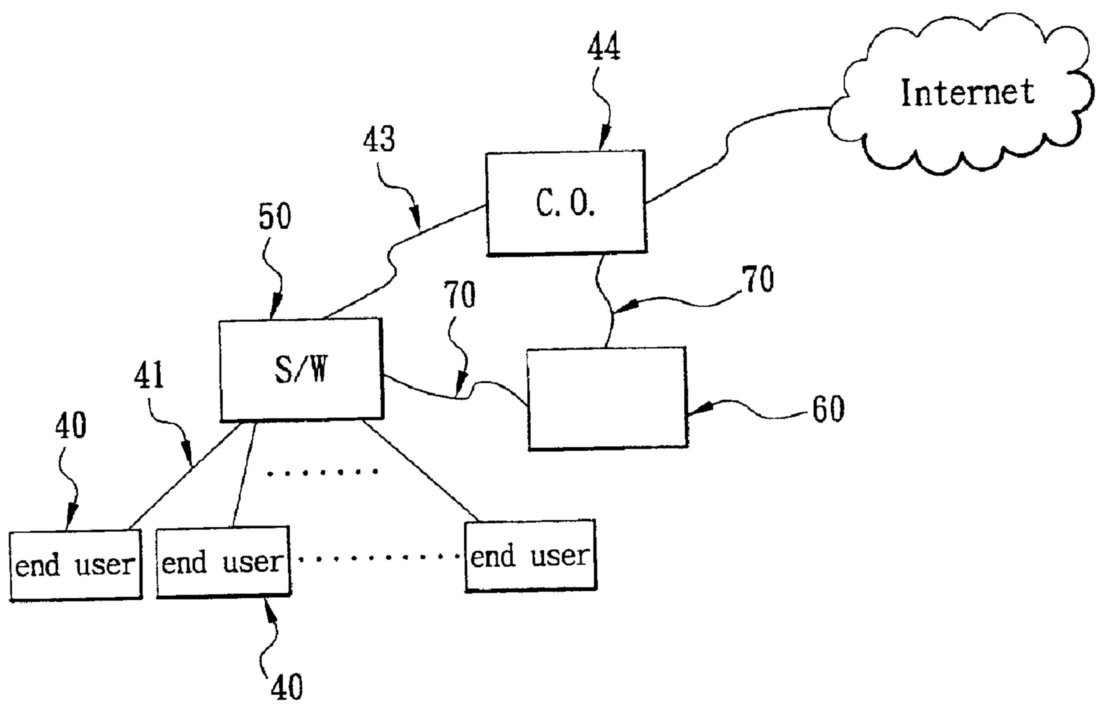
FIG. 6 schematically shows the connection of a network structure incorporating the FIG. 5 Ethernet switch according to the invention.

FIG. 6 schematically shows the connection of a network structure incorporating the FIG. 5 Ethernet switch 50 according to the invention. As shown in FIGS. 5 and 6 the plurality of network interface circuits 53 are coupled to Ethernet NICs 40 at end users through telephone lines 41. Network interface circuits 53 further couple to exchange 44 through Ethernet switching circuit 52 and fiber-optic line 43. Hence, typical data packet transmission between each end user 40 and exchange 44 is controlled by Ethernet switching circuit 52 for managing the transmission and receiving of packets. An independent line 70 is coupled between exchange 44 and Ethernet switch 50 so that exchange 44 may monitor and management Ethernet switch 50. Packet messages under monitor and management are sent to network management control circuit 51. This can prevent a potential hacker from entering a route for monitor and management. Also, a detection loop 531 is provided on each network interface circuit 53. Hence, based on management values of MIB 512 Ethernet switching circuit 52 can activate each detection loop 531 for performing a loop detection on network interface circuits 53 when network interface circuits 53 are disabled. The result is then written into MIB 512. SNMP 513 then collects the result for transmitting to exchange 44 for analysis and determination by network management personnel through the independent line 70. With this configuration, exchange can carry out an online real time monitor and management on a remote Ethernet switch 50, resulting in a reduction of maintenance cost, an increase of network transmission service quality, and many more.

In a preferred embodiment of the invention each of the plurality of network interface circuits 53 is implemented as a very high speed digital subscriber line (VDSL) interface circuit. Such VDSL interface circuit can transmit about 12M byte data per second up to an effective distance of 1.5 kilometer. Hence, the VDSL interface circuit is applicable in the UTP network structure of the invention as an interface circuit between each Ethernet NIC at end user 40 and Ethernet switch 50. This is a significant improvement as compared to the limitation of an effective distance of 100 meter applied by conventional Ethernet interface circuit on UTP. In another preferred embodiment of the invention, for ensuring network management packets to be capable of being fast and correctly transmitted to each Ethernet switch 50 when exchange 44 monitors and manages the Ethernet switches 50, the independent line 70 may be implemented as a fiber-optic line. The transmission thereof may be performed on a dedicate line or through an ADSL (or cable modem) so as to transmit management packets.

While the invention has been described by means of specific embodiments, numerous modifications and variations could be made thereto by those skilled in the art without departing from the scope and spirit of the invention set forth in the claims.

What is claimed is:

1. A system for managing a community Ethernet switch comprising:

at least one network interface circuit each coupled to an end user and an exchange through a first line so as to control a data packet transmission between each end user and said exchange for managing a transmission and a receiving of said data packet;

a second line coupled between said exchange and said Ethernet switch so that said exchange is arranged to monitor and manage said Ethernet switch and packet messages under monitor and management are sent to said Ethernet switch from said exchange;

a simple network management protocol (SNMP) installed on said Ethernet switch for setting a management value of a management Information base (MIB) so that said Ethernet switch is arranged to monitor said at least one network interface circuit based on maid management value; and a detection loop on each network interface circuit managed so that, based on said management value of said MIB, said Ethernet switch transmits enable or disable signals to each detection loop for activation, performs a loop detection on each network interface circuit writes a test result into said MIB, and commands said SNMP to collect said result for transmitting to said exchange.

2. The system of claim 1, wherein said Ethernet switch is arranged to write a test result into said MIB, commanding said SNMP to collect said result for transmitting to said exchange for analysis and determination by network management personnel.

3. The system of claim 1, wherein each network interface is a very high speed digital subscriber line (VDSL) interface circuit.

4. The system of claim 1, wherein said second line is a fiber-optic line and a transmission thereof is performed on a cable modem for transmitting said management packet messages.

5. A community Ethernet switch comprising:

an Ethernet switching circuit for either receiving data packets from an exchange or sending said data packets to said exchange through a first line;

a network management control circuit for receiving network management packets from said exchange through a second line and based on said received network management packets for setting a management value of a management information base (MIB) of a simple network management protocol (SNMP) by said SNMP; and a plurality of network interface circuits each coupled to an Ethernet NIC at an end user and said exchange;

wherein each network interface circuit transmits a management value of said MIB to said Ethernet switching circuit through a bus arranged such that, based on said management value, said Ethernet switching circuit monitors said network interface circuits, writes a test result into said MIB, and commands said SNMP to collect said result for transmitting to said exchange for analysis and determination by network management personnel, and wherein each network interface circuit comprises a detection loop coupled to said Ethernet switching circuit and arranged such that, based on said management value of said MIB, said Ethernet switching circuit transmits enable or disable signals to each detection loop for activation, performs a loop detection on each network interface circuit, writes a test result into said MIB, and commands said SNMP to collect said result for transmitting to said exchange.

6. The system of claim 5, wherein each network interface circuit is a very high speed digital subscriber line (VDSL) interface circuit.

* * * * *